US006763136B1

(12) United States Patent
Sweet

(10) Patent No.: US 6,763,136 B1
(45) Date of Patent: Jul. 13, 2004

(54) METHOD AND APPARATUS FOR DETERMINING SPECTRAL SIMILARITY

(75) Inventor: James Norman Sweet, San Diego, CA (US)

(73) Assignee: BAE Systems Mission Solutions, Inc., San Diego, CA (US)

(*) Notice: Subject to any disclaimer, the term of this patent is extended or adjusted under 35 U.S.C. 154(b) by 505 days.

(21) Appl. No.: 09/664,701

(22) Filed: Sep. 19, 2000

(51) Int. Cl.$^7$ .................................................. G06K 9/48
(52) U.S. Cl. ........................ 382/197; 382/191; 382/203; 382/209; 382/224
(58) Field of Search ................................ 382/103, 181, 382/190, 191, 197, 203, 209, 218, 219, 224, 253, 112

(56) References Cited

U.S. PATENT DOCUMENTS

| 4,912,770 | A | * | 3/1990 | Seto et al. ................... 382/107 |
| 5,329,595 | A | * | 7/1994 | Davies ........................ 382/103 |
| 5,513,128 | A | | 4/1996 | Rao ............................ 382/232 |
| 5,832,182 | A | | 11/1998 | Zhang et al. ................ 382/191 |
| 6,008,492 | A | | 12/1999 | Slater et al. ................. 250/334 |
| 6,075,891 | A | | 6/2000 | Burman ....................... 382/191 |
| 6,079,665 | A | | 6/2000 | Nella et al. ................. 244/3.17 |
| 6,208,752 | B1 | * | 3/2001 | Palmadesso et al. ........ 382/155 |
| 6,546,146 | B1 | * | 4/2003 | Hollinger et al. ........... 382/253 |

OTHER PUBLICATIONS

Abousleman, G.P., "Coding of Hyperspectral Imagery Using Adaptive Classification and Trellis–Coded Quantization," Society of Photo–Optical Instrumentation Engineers, 1997, 203–213, vol. 3071.

Blake, P., Hayashi, J., Lundeen, T.; Sharp, M. and Carinhas, P., "A Phenomenology–Based Approach to the Automated Recognition of Materials in HYDICE Imagery," IEEE International Geoscience and Remote Sensing Symposium, 1998, 1004–1006, IEEE Publications, Piscataway, New Jersey.

Canta, G.R. and Poggi, G., "Kronecker–Product Gain–Shape Vector Quantization for Multispectral and Hyperspectral Image Coding," IEEE Transactions on Image Processing, May 1998, 668–678, vol. 7, No. 5, IEEE Publications, Picataway, New Jersey.

(List continued on next page.)

Primary Examiner—Daniel Mariam
(74) Attorney, Agent, or Firm—Cooley Godward LLP

(57) ABSTRACT

A method is disclosed herein for measuring similarity between a first vector and a second vector wherein (i) each element of the first vector represents a first reflectance associated with a respective one of a plurality of spectral bands, and (ii) each element of the second vector represents a second reflectance associated with a respective one of such plurality of spectral bands. The method contemplates determining a magnitude difference and a shape difference between the first vector and the second vector. A similarity between the first vector and the second vector is computed on the basis of the magnitude difference and the shape difference. Further, an image processing method is disclosed herein in which a first input pixel is extracted from a received spectral image or other data source. The first input pixel is converted into a first vector, wherein each element in the first vector represents a reflectance of a respective one of a plurality of spectral bands. A magnitude and a shape difference are determined between the first vector and a second vector from a received spectral image or other data source. A similarity between the first vector and the second vector is determined on the basis of the magnitude difference and the shape difference.

26 Claims, 18 Drawing Sheets

OTHER PUBLICATIONS

Image Resolution Assessment and Reporting Standards (IRARS) Committee, 1995, "Multispectral Imagery Interpretability Rating Scale, Reference Guide," http://www.fas.org/irp/imint/niirs_ms/msiirs.htm#IIRS.

Image Resolution Assessment and Reporting Standards (IRARS) Committee, 1996a, "Civil NIIRS Reference Guide, Appendix III, History of NIIRS," http://www.fas.org/irp/imint/niirs_c/.

Image Resolution Assessment and Reporting Standards (IRARS) Committee, 1996b, Civil NIIRS Reference Guide, http://www.fas.org/irp/imint/niirs_c/guide.htm.

Memon, N.D., "A Bounded Distortion Compression Scheme for Hyperspectral Image Data," International Geoscience and Remote Sensing Symposium, Apr. 1996, 1039–1041, IEEE Publications, Picataway, New Jersey.

Qlan, S., Hollinger, A.B., Williams, D., and Manak, D., "Fast Three–Dimensional Data Compression of Hyperspectral Imagery Using Vector Quantization with Spectral–Feature–Based Binary Coding," Optical Engineering, Nov. 11, 1996, 3242–3249, vol. 35, No. 11, Society of Photo–Optical Instrumentation Engineers.

Reitz, J..P, Brower, B.V., and Lan, A., "Hyperspectral Compression Using Spectral Signature Matching With Error Encoding," Society of Photo–Optical Instrumentation Engineers, Jun. 1996, 64–73, vol. 2821.

Roger, R.E. and.Arnold, J.R., Reliably Estimating the Noise In AVIRIS Hyperspectral Images, Int. J. Remote Sensing, 1996, 1951–1962, vol. 17, No. 10, Taylor & Francis Ltd.

Halford, Carl E., "Developing Operational Performance Metrics Using Image Comparison Metrics And The Concept Of Degradation Space", Society of Photo–Optical Instrumentation Engineers; Optical Engineering, vol. 38, No. 5, pp. 836–844, (May 1999).

Leachtenauer, Jon C., "General Image–Quality Equation: GIQE", Applied Optics, vol. 36, No. 32 (Nov. 10, 1997).

Nill, Norman B., "Objective Image Quality Measure Derived from Digital Image Power Spectra", Society of Photo–Optical Instrumentation Engineers, Optical Engineering, vol. 31, No. 4, pp. 813–825 (Apr. 1992).

Smith, Steven L., "Understanding Image Quality Losses Due to Smear in High–Resolution Remote Sensing Imaging Systems", Society of Photo–Optical Instrumentation Engineers, Optical Engineering, vol. 38, No. 5, pp. 821–826 (May 1999).

Jafarkhani, et al "Adaptive image coding using spectral classification", Institute for systems research University of Maryland, pp. 1015, 1997.

Chang, et al "Unsupervised hyperspectral image analysis using independent component analysis", IEEE, pp. 3136–3138, 2000.

Qian, et al. "Vector quntization using spectral index based multiple sub–codebooks for hyperspectral data compression", IEEE, pp. 1183–1190, 2000.

* cited by examiner

| SSV on 24 May 1998 | | | | | | SSV on 16 Aug. 1998 | | | | |
|---|---|---|---|---|---|---|---|---|---|---|
| LB. N / ac. | 240 | 120 | 80 | 40 | 0 | LB. N / ac. | 240 | 120 | 80 | 40 | 0 |
| 240 | 0 | | | | | 240 | 0 | | | | |
| 120 | 0.0219 | 0 | | | | 120 | 0.0031 | 0 | | | |
| 80 | 0.0138 | 0.007 | 0 | | | 80 | 0.0043 | 0.004 | 0 | | |
| 40 | 0.0159 | 0.013 | 0.009 | 0 | | 40 | 0.0143 | 0.012 | 0.011 | 0 | |
| 0 | 0.024 | 0.031 | 0.026 | 0.018 | 0 | 0 | 0.035 | 0.031 | 0.033 | 0.022 | 0 |

| SSV on 31 May 1998 | | | | | | SSV on 30 Aug. 1998 | | | | |
|---|---|---|---|---|---|---|---|---|---|---|
| LB. N / ac. | 240 | 120 | 80 | 40 | 0 | LB. N / ac. | 240 | 120 | 80 | 40 | 0 |
| 240 | 0 | | | | | 240 | 0 | | | | |
| 120 | 0.0122 | 0 | | | | 120 | 0.0045 | 0 | | | |
| 80 | 0.0126 | 0.004 | 0 | | | 80 | 0.0091 | 0.005 | 0 | | |
| 40 | 0.0081 | 0.008 | 0.006 | 0 | | 40 | 0.0233 | 0.018 | 0.013 | 0 | |
| 0 | 0.014 | 0.018 | 0.015 | 0.010 | 0 | 0 | 0.039 | 0.033 | 0.030 | 0.019 | 0 |

| SSV on 12 July 1998 | | | | | | SSV on 6 Sept. 1998 | | | | |
|---|---|---|---|---|---|---|---|---|---|---|
| LB. N / ac. | 240 | 120 | 80 | 40 | 0 | LB. N / ac. | 240 | 120 | 80 | 40 | 0 |
| 240 | 0 | | | | | 240 | 0 | | | | |
| 120 | 0.0218 | 0 | | | | 120 | 0.0088 | 0 | | | |
| 80 | 0.0260 | 0.023 | 0 | | | 80 | 0.0181 | 0.018 | 0 | | |
| 40 | 0.0278 | 0.042 | 0.023 | 0 | | 40 | 0.0252 | 0.017 | 0.017 | 0 | |
| 0 | 0.087 | 0.098 | 0.080 | 0.050 | 0 | 0 | 0.041 | 0.034 | 0.020 | 0.020 | 0 |

| SSV on 19 July 1998 | | | | | | SSV on 4 Oct. 1998 | | | | |
|---|---|---|---|---|---|---|---|---|---|---|
| LB. N / ac. | 240 | 120 | 80 | 40 | 0 | LB. N / ac. | 240 | 120 | 80 | 40 | 0 |
| 240 | 0 | | | | | 240 | 0 | | | | |
| 120 | 0.0068 | 0 | | | | 120 | 0.0144 | 0 | | | |
| 80 | 0.0154 | 0.010 | 0 | | | 80 | 0.0107 | 0.009 | 0 | | |
| 40 | 0.0155 | 0.012 | 0.009 | 0 | | 40 | 0.0118 | 0.005 | 0.005 | 0 | |
| 0 | 0.058 | 0.056 | 0.047 | 0.040 | 0 | 0 | * | * | * | * | 0 |

Fig. 6

METHOD AND APPARATUS FOR DETERMINING SPECTRAL SIMILARITY

FIELD OF THE INVENTION

The present invention relates to the field of image processing, and more particularly to a method and system for quantitatively characterizing the difference between reflectance spectra. Such characterization facilitates the performance of several useful image processing functions; including the quality evaluation of multispectral and hyperspectral imagery.

BACKGROUND OF THE INVENTION

It has recently become possible to commercially obtain satellite and aerial images of terrain of interest from a number of sources. For example, certain large farms currently use satellite images provided by Landsat, the system of land-observing satellites operated by the federal government. Landsat satellites orbit the earth at approximately 900 km., and provide images in which each pixel represents a square area of between 1 $m^2$ and 1E6 $m^2$. A pixel area of 100 $m^2$ is common for systems designed for land-use purposes. Visible, near-infrared, shortwave infrared, thermal infrared sensors deployed on such satellites can detect, among other things, the spectral reflectance, temperature, and other physical characteristics of specified terrestrial areas such as a farm's fields. In one application, these images are overlaid onto farm mapping programs to show areas of plant stress or potential yield.

The sensors used in generating the images used for many commercial purposes are typically characterized as either "multispectral" or "hyperspectral". Currently, multispectral sensors collect images of a terrain or landscape and provide a handful of wide spectral bands of imagery, which sample the visible, short wave infrared, and, in some instruments, thermal infrared portion of the electromagnetic spectrum. Similarly, hyperspectral sensors typically provide hundreds of narrow spectral bands of spatial imagery that span the visible, near-infrared, and shortwave infrared portion of the electromagnetic spectrum. As a result, images obtained using hyperspectral sensors generally afford greater spectral discrimination than those obtained using multispectral sensors.

Despite the existence of myriad techniques for processing image data collected from multispectral and hyperspectral sensors, there is not known to exist an objective standard for determining the quality of an image based upon its spectral characteristics. Conventionally, image quality is inferred based upon measurements of a number of parameters including, for example, spatial resolution, calibration accuracy, spectral resolution, signal to noise, contrast, bit error rate, dynamic range, sensor stability, and geometric registration. A manual and subjective image quality evaluation is known as the *Multispectral Imagery Interpretability Rating Scale* ("MS IIRS"). See, for example, the *Multispectral Imagery Interpretability Rating Scale, Reference Guide* (http://www.fas.org/irp/imint/niirs ms/msiirs.htm#IIRS), produced by the Image Resolution Assessment and Reporting Standards Committee (1995). However, the MS IIRS is currently continuing to be refined, and is not widely used. Attempts have also been made to derive mathematical constructs indicative of image quality. One such construct is known as *The General Image Quality Equation* ("GIQE") is used in parametric evaluation of single band images. See, e.g., Leachtenauer, J. C., Malila, W., Irvine J., Colburn, L., and Salvaggio, N., 10 Nov. 1997, *General Image-Quality Equation*, Applied Optics, Vol. 36, No. 32. The GIQE may also be used to produce an image quality value applicable to the *National Interpretability Rating Scale* ("NIIRS"). See, e.g., *Civil NIIRS Reference Guide, Appendix III, History of NIIRS* (http://www.fas.org/irp/imint/niirs c/), from the Image Resolution Assessment and Reporting Standards Committee (1996a) and the *Civil NIIRS Reference Guide* (http://www.fas.org/irp/imint/niirs c/guide.htm), also from the Image Resolution Assessment and Reporting Standards Committee (1996b). However, the MS IIRS, GIQE and NIIRS are not known to be useful in objectively assessing the quality of multispectral or hyperspectral images.

SUMMARY OF THE INVENTION

In summary, the present invention pertains to a method for measuring similarity between a first vector and a second vector wherein (i) each element of the first vector represents a first reflectance associated with a respective one of a plurality of spectral bands, and (ii) each element of the second vector represents a second reflectance associated with a respective one of such plurality of spectral bands. The inventive method contemplates determining both a magnitude difference and a shape difference between the first vector and the second vector. A similarity between the first vector and the second vector is computed based on such magnitude and shape differences.

In another aspect, the present invention relates to a method for measuring similarity between a first mean spectral vector and a second mean spectral vector. The inventive method contemplates deriving the first mean spectral vector from a first set of spectral vectors, and deriving the second mean spectral vector from a second set of spectral vectors. A magnitude difference and a shape difference are each determined between the first mean spectral vector and the second mean spectral vector. A similarity between the first mean spectral vector and the second mean spectral vector is computed based on the magnitude difference and the shape difference.

In yet another aspect, the present invention relates to an image processing method in which a first input pixel is extracted from a received spectral image. The first input pixel is converted into a first vector, wherein each element in the first vector represents a reflectance of a respective one of a plurality of spectral bands. A magnitude and a shape difference are determined between the first vector and a second vector. A similarity between the first vector and the second vector is determined based on these magnitude and shape differences.

The present invention also relates to an image processing system including an input interface through which is received a spectral image. The image processing system further includes a storage medium having stored therein a spectral similarity stored program. A processor of the image processing system is operative to execute the spectral similarity stored program and thereby: (i) organize pixels from the spectral image into a plurality of classes, (ii) determine a first mean reflectance vector for a first of said plurality of classes and a second mean reflectance vector for a second of said plurality of classes, and (iii) compute a similarity between said first mean reflectance vector and the second mean reflectance vector based upon a magnitude difference and a shape difference therebetween.

BRIEF DESCRIPTION OF THE DRAWINGS

In the accompanying drawings:

FIG. 6 provides a tabular listing of an exemplary set of minimum SSVs required to discriminate between portions of a field of corn receiving differing amounts of a nitrogen fertilizer application.

DETAILED DESCRIPTION OF THE INVENTION

System Overview

Figure 1:
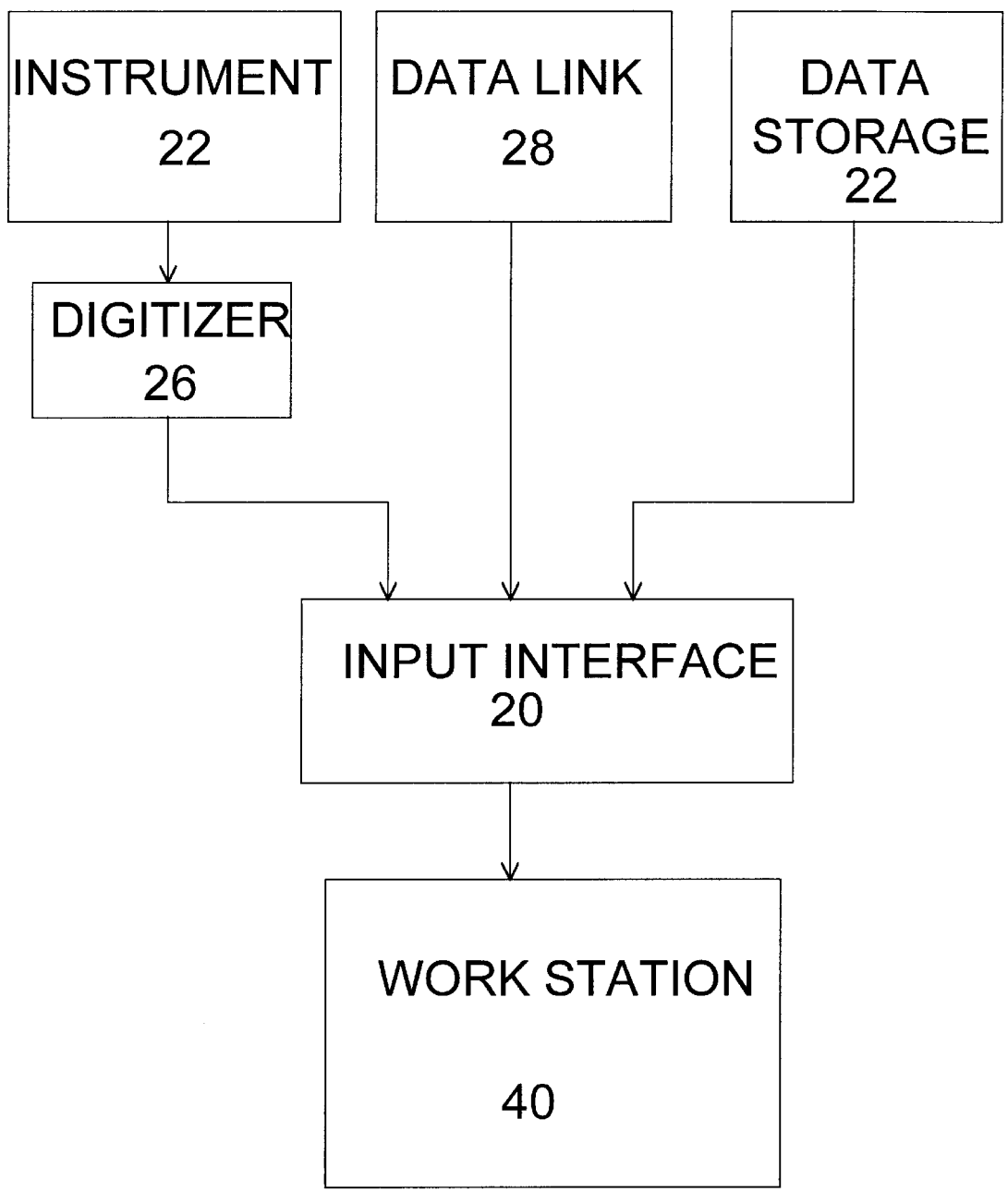
FIG. 1 illustratively represents an exemplary imaging system for producing spectral images disposed to be characterized in accordance with the teachings of the present invention.

FIG. 1 illustratively represents an exemplary imaging system for producing spectral images disposed to be characterized in accordance with the teachings of the present invention. As is described herein, the teachings of the present invention may be utilized to quantitatively characterize images obtained using data collected by various instruments and systems. In the system of FIG. 1, data from any of a variety of sources may be received through an input interface 20. Typical data sources include (i) an instrument 22 that provides an analog output signal converted to digital data in a digitizer 26 before being provided to the input interface 20, (ii) a data transmission link 28 that provides digital data directly to the interface 20, and (iii) recorded data storage equipment 32, such as readers for magnetic disks, CD-ROMs, magnetic tape, etc.

The instrument 22 may be realized using any of various types of instrument systems which provide signals indicative of spectral reflectance, such as multi-band digital imaging cameras, color television cameras, multi-band infrared scanners, visible light microscopes, spectroradiometers and the like. Although in the preferred embodiment of FIG. 1 the instrument 22 is disposed to measure spectral reflectance, in alternate implementations other spectral characteristics (e.g. spectral emission) may be measured and processed in accordance with the present invention. Signals are provided by the instrument(s) 22 to the digitizer 26, which produces a set of image pixels defining the optical characteristics of the object or terrain of interest. The data in a single image pixel provided by the digitizer 26, data link 28, or data storage 32 consists of a number of data samples (typically between 10 and 200) which collectively form a spectral "signature" of the image pixel. Each data sample corresponds to the reflectance or ratio of emission of photons from the object as compared to the photons illuminating the surface or terrain of interest at some spectral wavelength.

As is indicated by FIG. 1, a set of image pixels (i.e., an "image set") from the digitizer 26, data link 28 or data storage 32 is provided to the input interface 20. The data received through the input interface 20 is provided to a workstation 40, a computer system capable of appropriate processing, such as image processing. An example of a computer system which may be utilized for characterization of images in accordance with the invention is an HP 9000/720 workstation running under the HP-UNIX operating system, or alternatively a SPARC 20 workstation from Sun Microsystems, Inc. As recognized by those skilled in the art, the workstation 40 includes standard off-the-shelf computing components. Because these computing components, such as a central processing unit, memory storage components, and peripheral devices are generally known to those skilled in the art they will not be explained in greater detail. In the alternative, discrete logic devices and specially designed integrated circuits and commercially available processors can also be used to implement the systems and methods consistent with this invention.

In accordance with the invention, each spectral signature is converted by the workstation 40 into an N-element spectral vector, where N is the number of bands of interest in the received image set. The elements of each spectral vector correspond to the intensity of a pixel for each spectral band in the image set. This step of the present invention may be effected using conventional image processing software such as, for example, the ENVI program available from Research Systems Inc., of Boulder, Colo. The similarity of various pairs of these N-element spectral vectors may then be characterized with reference to the Spectral Similarity Scale of the present invention. A quality of the image represented by the received image set may then be ascertained by evaluating the similarity among such pairs of N-element spectral vectors in the manner described herein.

Spectral Similarity Scale

The Spectral Similarity Scale may be used to provide an indication of the similarity between the spectral vectors associated with a given pair of image pixels or other sources of spectral data. In contrast to conventional techniques, such similarity is defined as a function of both the difference in shape between such vectors and the difference in magnitude therebetween. The dependence of the Spectral Similarity Scale upon both correlation and normalized Euclidean Distance accounts for both "shape" and "magnitude" differences between the vectors under consideration. As is described further below, an indication of image quality and other useful information can be determined by making comparisons among the spectral vectors associated with many different pairs of pixels from an image or other sources of spectral data using the Spectral Similarity Scale.

Consistent with the invention, a Spectral Similarity Value ("SSV") is computed in accordance with the following expression:

$$\text{Spectral Similarity Value} = \sqrt{d_e^2 + \hat{r}^2} \quad \text{(Equation 1)}$$

where the Euclidean distance ($d_e$) and normalized correlation coefficient ($\hat{r}$) are defined below. An SSV represents the similarity between a pair of spectral vectors in terms of the Spectral Similarity Scale. In a preferred implementation, the Spectral Similarity Scale has a minimum of zero and a maximum of the square root of two. In this implementation, a small SSV is indicative of a pair of similar spectral vectors.

Normalized Euclidean Distance

As mentioned above, the present invention contemplates representing a difference in magnitude between a pair of spectral vectors by determining a normalized Euclidean Distance between such vectors. The normalized Euclidean Distance ($d_e$) between the spectral vectors X and Y is determined as follows:

$$d_e = \sqrt{\frac{1}{Nb} \sum_{i=1}^{Nb} (x_i - y_i)^2} \quad \text{(Equation 2)}$$

In Equation 2, Nb is the number of spectral bands encompassed by the vectors X and Y, $x_i$ is the value of the vector X in the $i^{th}$ spectral band, and $y_i$ is the value of the vector Y in the $i^{th}$ spectral band. The inclusion of the factor 1/Nb within renders the Euclidean Distance independent of the number of spectral bands (Nb). Accordingly, the normalized Euclidean Distance is representative of the normalized average distance between a pair of spectral vectors and ranges in value between zero and one.

Normalized Correlation Coefficient

The normalized correlation coefficient ($\hat{r}$) is given as:

$$\hat{r} = 1 - r^2 \quad \text{(Equation 3)}$$

where $r^2$ is computed as follows:

$$r^2 = \left( \frac{\frac{1}{Nb-1} \sum_{i=1}^{Nb} (x_i - \mu_x)(y_i - \mu_y)}{\sigma_x \sigma_y} \right)^2 \quad \text{(Equation 4)}$$

In Equation 4, $\mu_x$ denotes the mean value of vector X, $\sigma_x$ denotes the standard deviation of the vector X, $\mu_y$ denotes the mean value of vector Y, and $\sigma_y$ denotes the standard deviation of the vector Y. Equation 4 has been formulated such that the value of the metric $r^2$ ranges between zero and one. The metric $r^2$ provides an indication of the similarity between the shapes of the vectors X and Y, since subtraction of the means $\mu_x$ and $\mu_y$ removes dependence upon bias terms and dividing by the standard deviations $\sigma_x$ and $\sigma_y$ removes dependence upon gain factors. The mean and standard deviation of vector X are computed using Equation 5 and Equation 6, respectively:

$$\mu_X = \frac{\sum_{i=1}^{Nb} X_i}{Nb} \quad \text{(Equation 5)}$$

$$\sigma_X = \sqrt{\frac{Nb \sum_{i=1}^{Nb} X_i^2 - \left( \sum_{i=1}^{Nb} X_i \right)^2}{Nb(Nb-1)}} \quad \text{(Equation 6)}$$

The mean and standard deviation of vector Y may be computed by substituting $Y_i$ for $X_i$ in Equation 5 and in Equation 6, respectively.

Figure 2A:
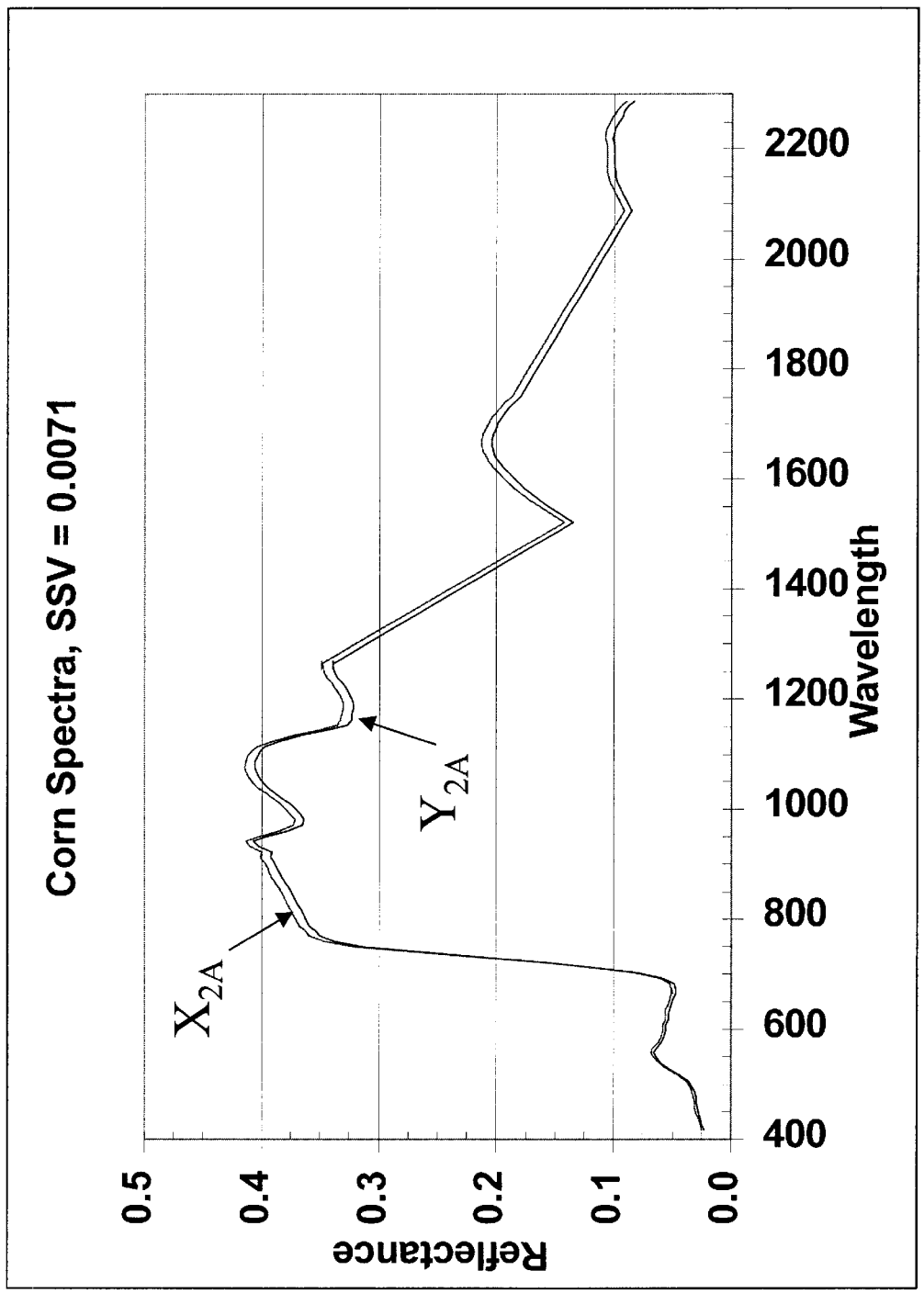
FIGS. 2A–2C and 3A–3D provide graphical representations of exemplary pairs of spectral vectors with respect to which Spectral Similarity Values may be computed in accordance with the present invention.
Figure 2B:
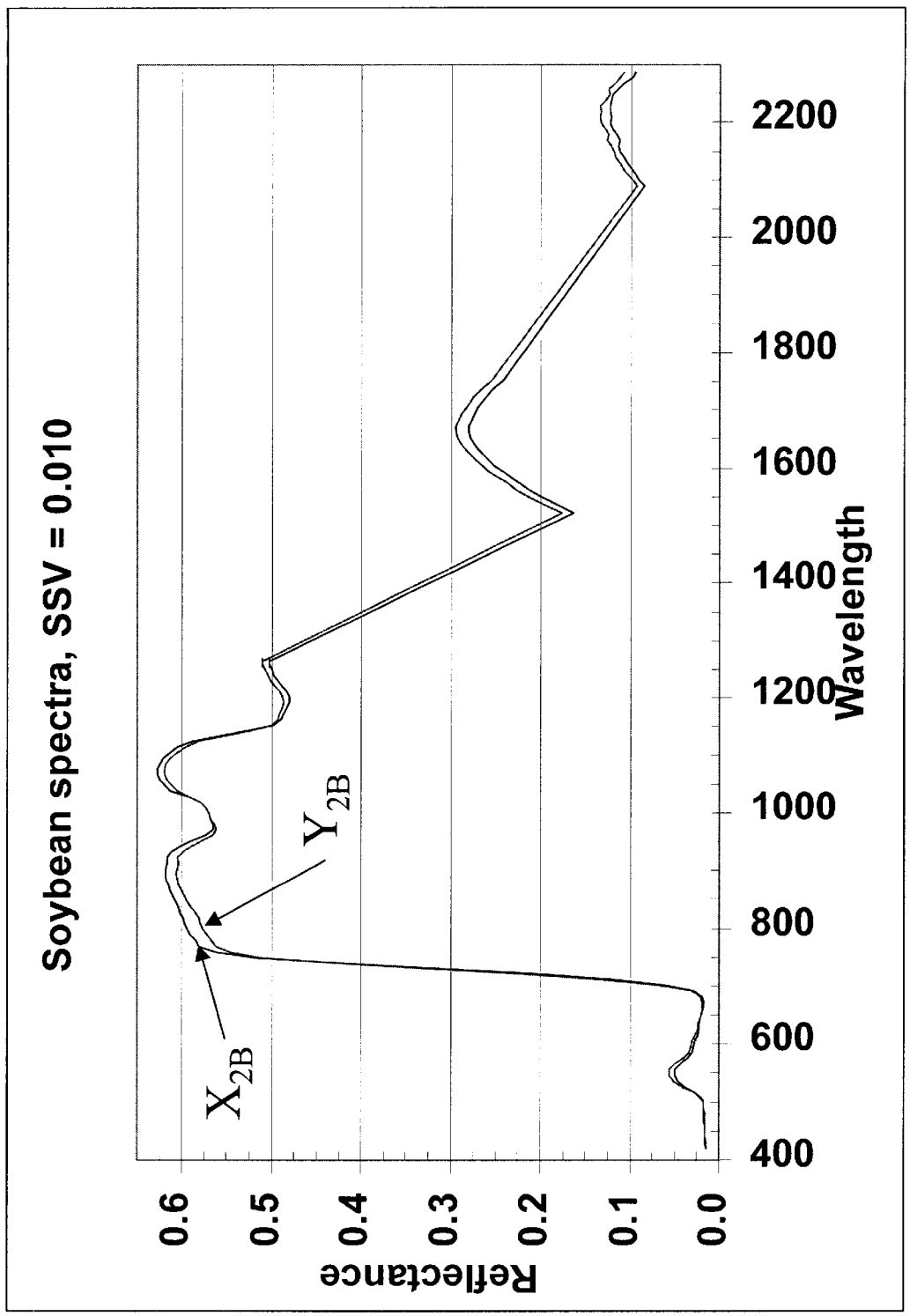
Figure 2C:
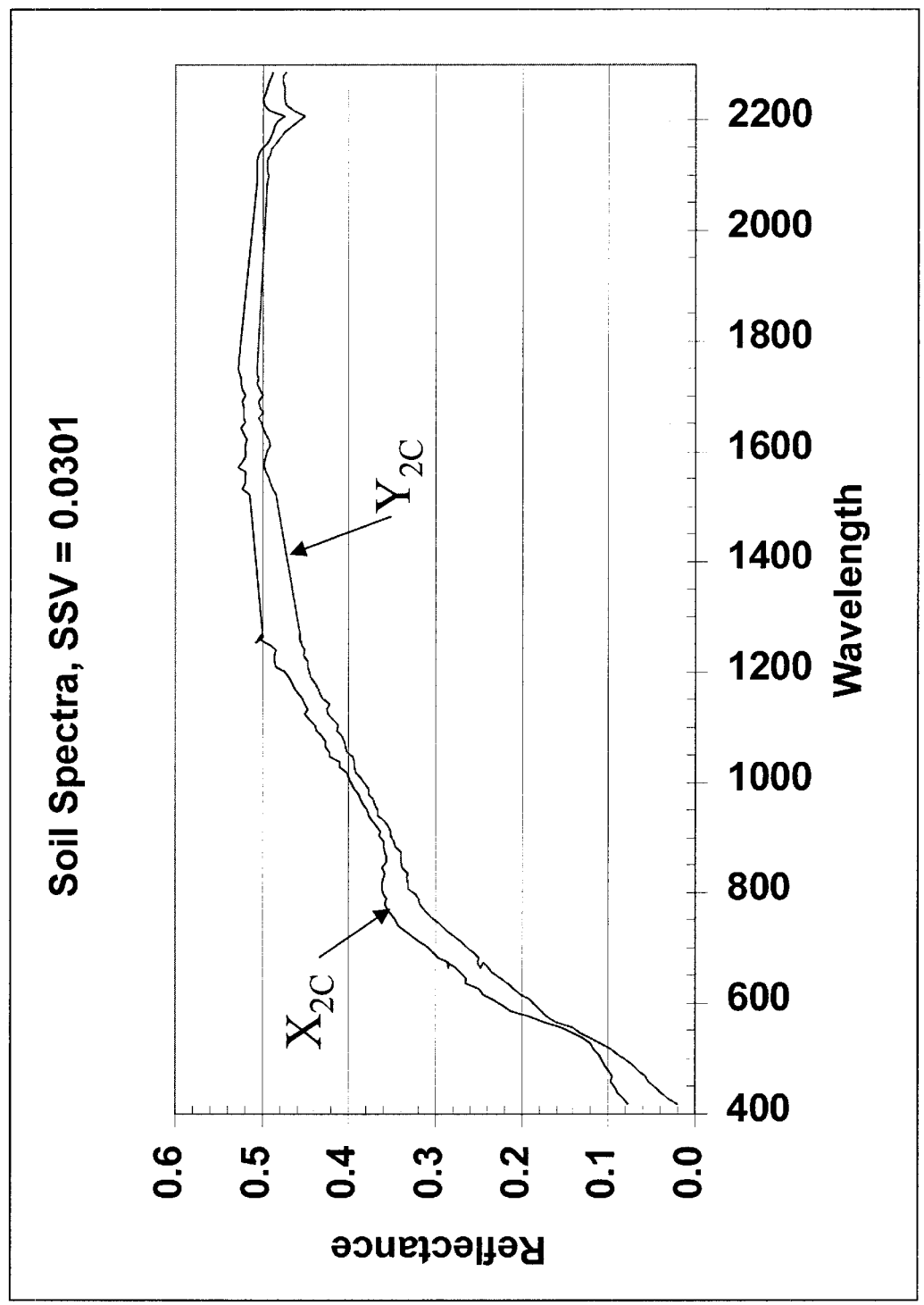

FIGS. 2 and 3 provide graphical representations of exemplary pairs of spectral vectors with respect to which SSVs may be computed in accordance with the present invention. Referring to FIG. 2A, a graphical illustration is provided of spectral vectors $X_{2A}$ and $Y_{2A}$ obtained from a pair of pixels within a received image set representative of some quantity of corn. Evaluation of Equations 1 through 6 using the spectral vectors $X_{2A}$ and $Y_{2A}$ yields an SSV of 0.0071. Similarly, FIG. 2B provides a graphical illustration of a pair of spectral vectors $X_{2B}$ and $Y_{2B}$ derived from a corresponding pair of pixels in an image set representative of a soybean. In the example of FIG. 2B, evaluation of Equations 1 through 6 using the spectral vectors $X_{2B}$ and $Y_{2B}$ results in an SSV of 0.010. In FIG. 2C, a pair of spectral vectors $X_{2B}$ and $Y_{2B}$ derived from a corresponding pair of pixels in an image set representative of soil are graphically depicted. In the case of FIG. 2C, evaluation of Equations 1 through 6 using the spectral vectors $X_{2C}$ and $Y_{2C}$ yields an SSV of 0.0301.

Figure 3A:
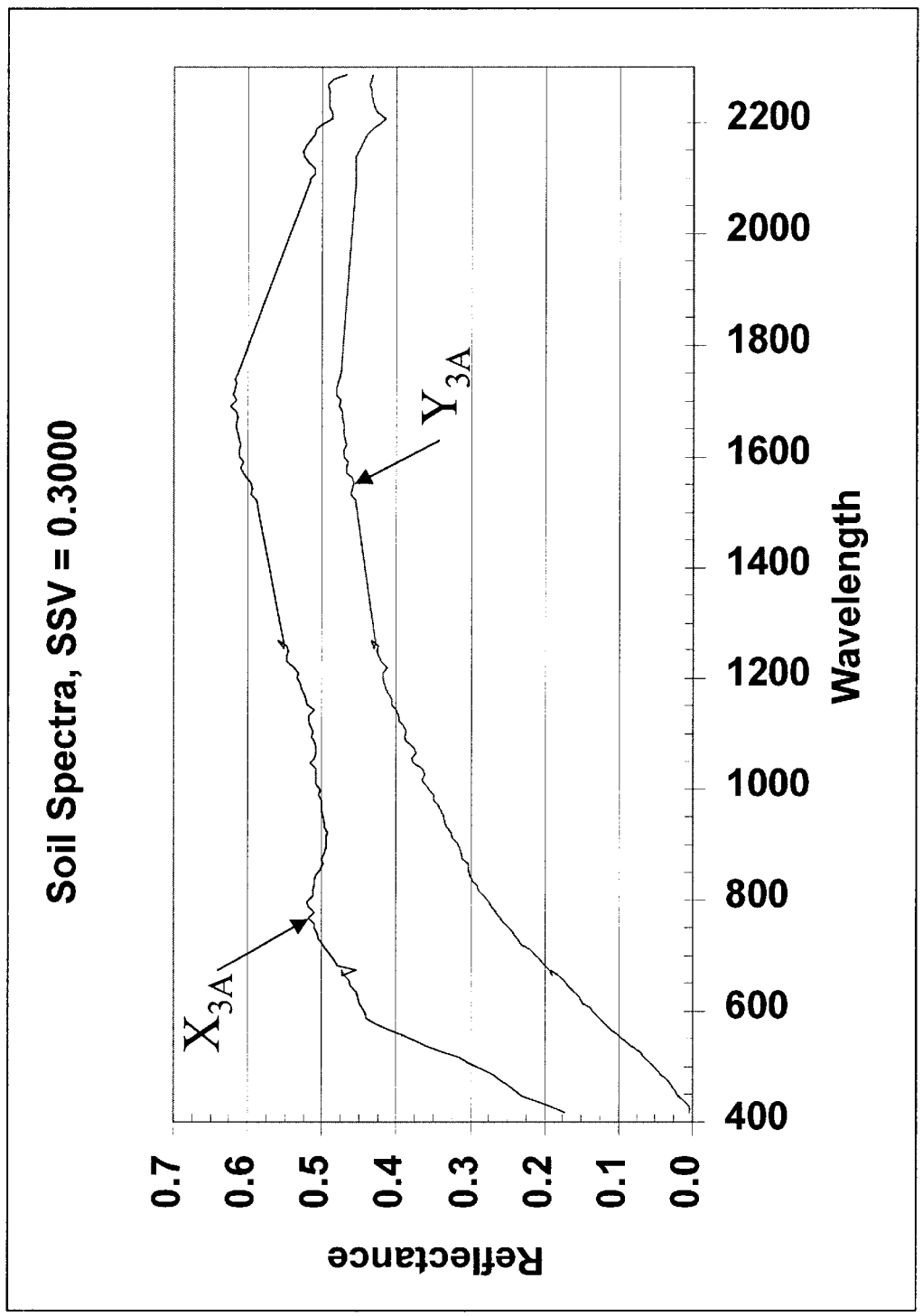
Figure 3B:
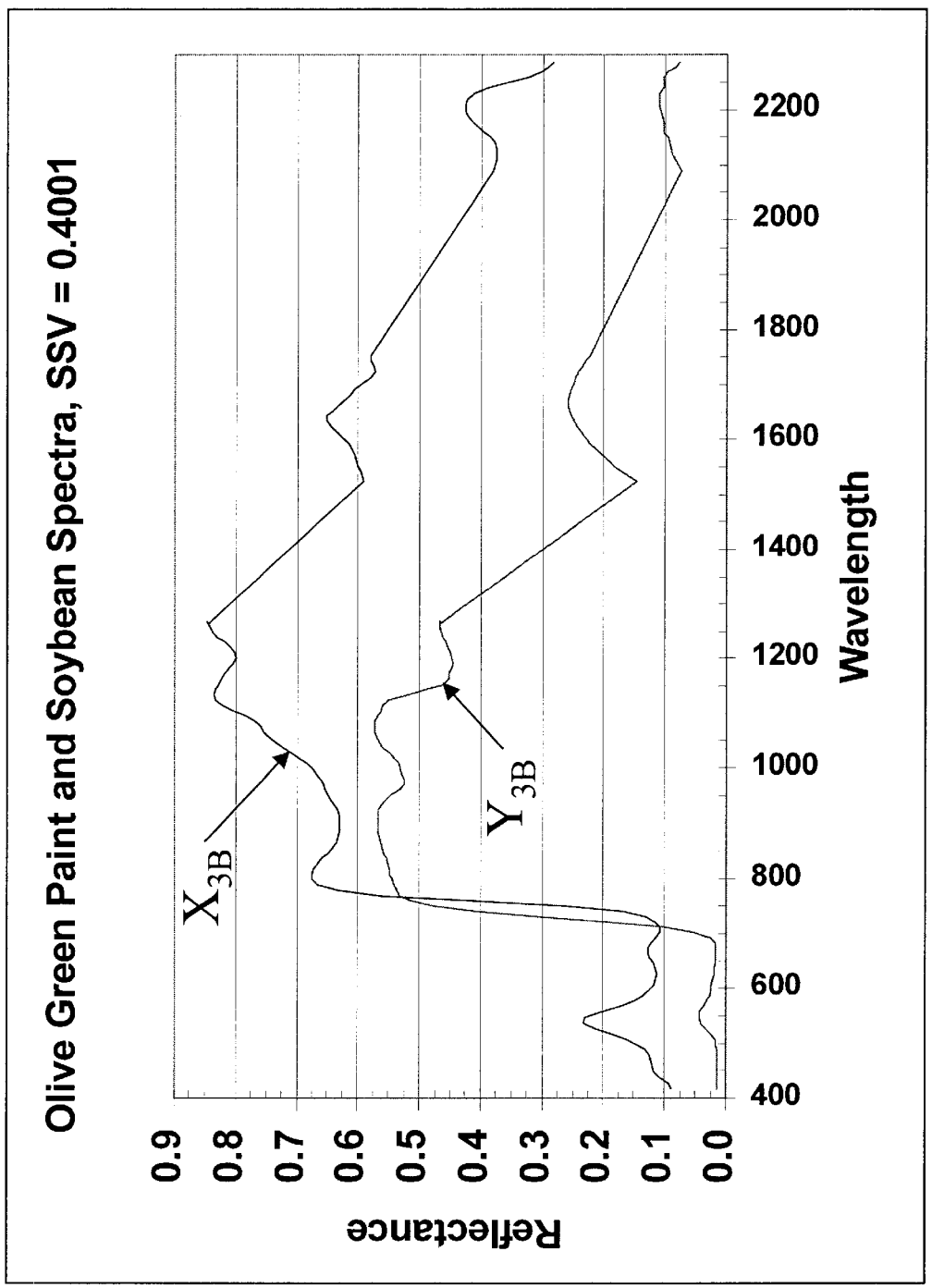
Figure 3C:
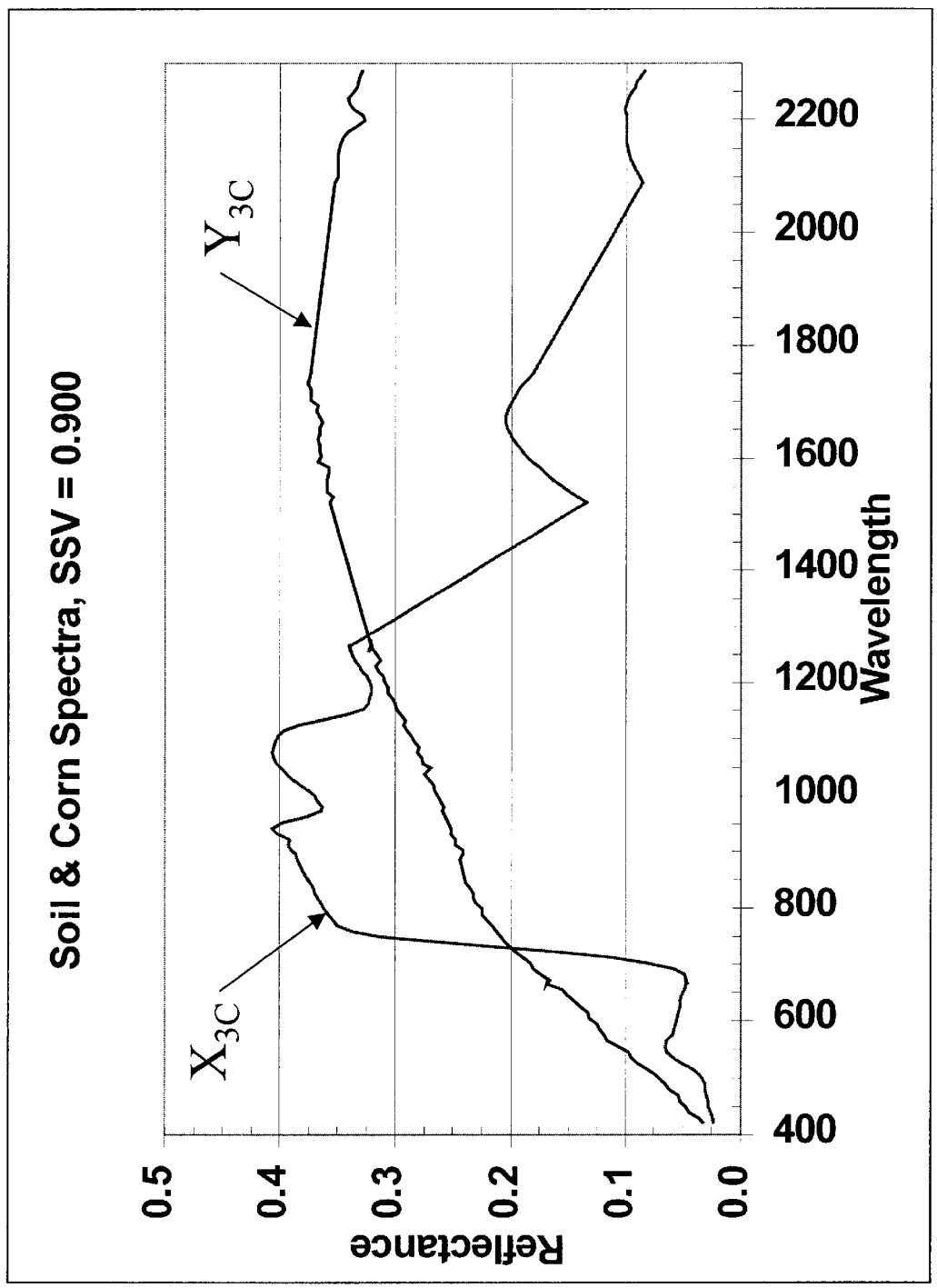

FIGS. 3A–3D provide graphical representations of somewhat more dissimilar pairs of spectral vectors than those depicted in FIGS. 2A–2C. For example, the spectral vectors $X_{3A}$ and $Y_{3A}$ in FIG. 3A are characterized by an SSV of 0.3000. Similarly, the spectral vectors $X_{3B}$ and $Y_{3B}$ of FIG. 3A yield an SSV of 0.4001, the spectral vectors $X_{3C}$ and $Y_{3C}$ in FIG. 3C are characterized by an SSV of 0.900, and the spectral vectors $X_{3D}$ and $Y_{3D}$ in FIG. 3D result yield an SSV of 1.3224.

Figure 3D:
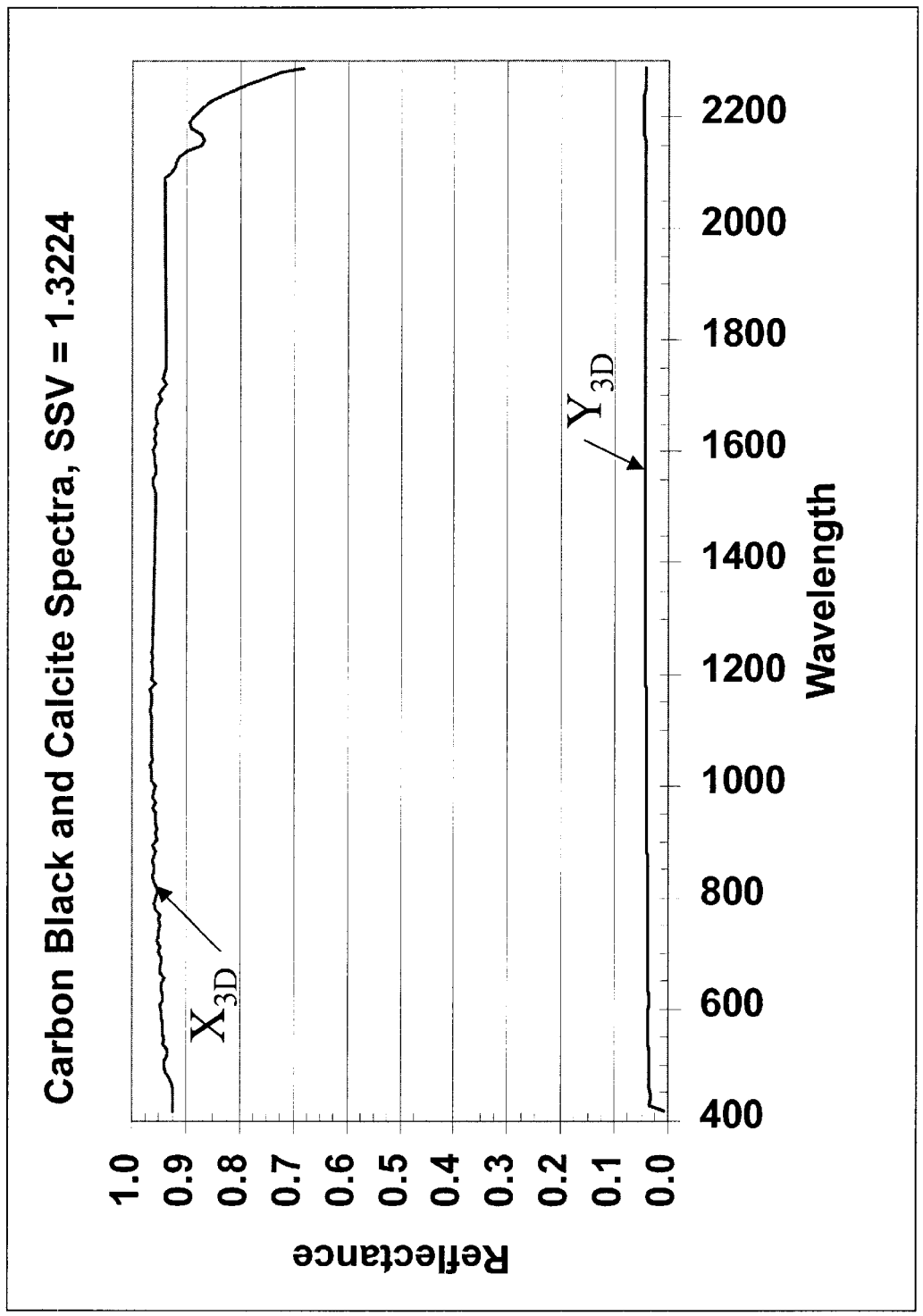

FIGS. 3C and 3D are representative of cases in which the Spectral Similarity Scale of the present invention offers advantages relative to other potential analysis techniques. For example, notwithstanding the significant "shape" differences between vectors $X_{3C}$ and $Y_{3C}$, the Euclidean distance separating these vectors is relatively small. Accordingly, characterization of the similarity between vectors $X_{3C}$ and $Y_{3C}$ solely based on Euclidean distance could be misleading in view of their substantially different shapes. The converse situation is presented by FIG. 3D; namely, vectors $X_{3D}$ and $Y_{3D}$ are very similar in shape but separated by a large Euclidean distance. It follows that characterization of the vectors $X_{3D}$ and $Y_{3D}$ exclusively based on their similarity in shape also would not be desirable, since this would fail to take into account the substantial reflectance offset between the two vectors. In contrast, the SSV characterizing the vectors $X_{3C}$ and $Y_{3C}$ inherently factors in their substantial difference in shape, while the SSV for the vectors $X_{3d}$ and $Y_{3d}$ takes into account their substantial difference in magnitude.

Image Quality Assessment

Figure 4:
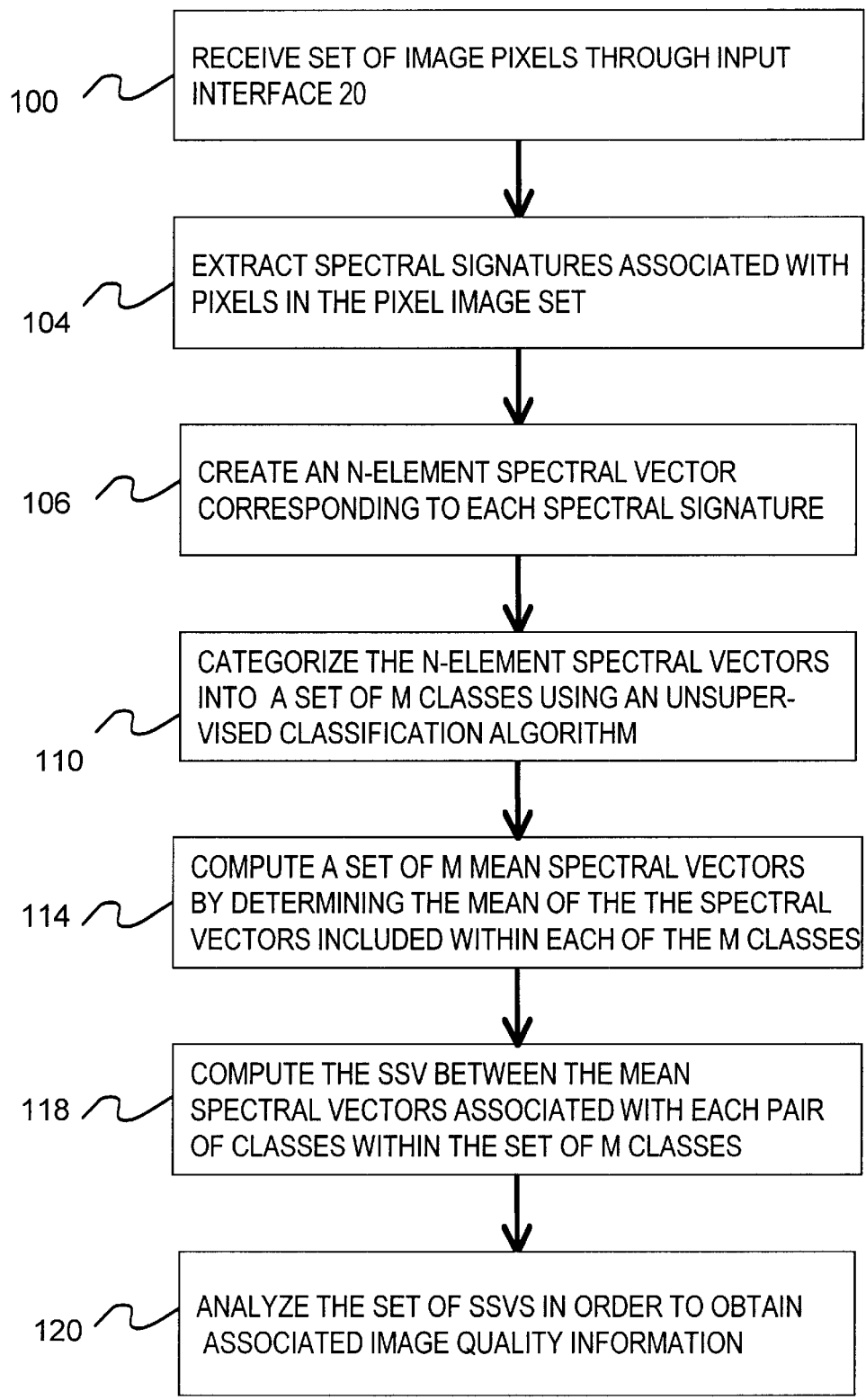
FIG. 4 is a flow chart of a sequence of steps performed in processing a set of image pixels in order to determine quality of the associated image in a manner consistent with the present invention.

FIG. 4 is a flow chart of a sequence of steps performed by workstation 40 in processing a set of image pixels in order to determine quality of the associated image in a manner consistent with the present invention. First, the set of image pixels is received through the input interface 20 (step 100). Next, spectral signatures associated with the pixels included within the set of image pixels are extracted (step 104). Each of these spectral signatures is then converted into an N-element spectral vector (step 106). The N elements of each spectral vector correspond to the intensity of a pixel for each spectral band in the image set.

Once a collection of N-element spectral vectors corresponding to an image has been created as described above, the vectors are categorized into a set of M classes using an unsupervised classification algorithm(step 110). Unsupervised classification is appropriate in the present context as assessments of image quality made in accordance with the present invention have been found to be relatively independent of the precise collection of spectral vectors assigned to particular classes. Next, a set of M mean spectral vectors is computed by determining the mean (e.g., the mean reflectance as a function of wavelength) of the spectral vectors comprising each of the M classes (step 114). The SSV between the mean spectral vectors associated with each pair of classes within the set of M classes is then determined using Equations 1 through 6 (step 118). For example, there exist 325 possible class pair combinations for a set of 26 classes (M=26), and thus in such case a set of 325 SSVs would be computed in step 118. Although the foregoing describes utilization of an unsupervised classification algorithm in the context of a preferred embodiment of the present invention, it should be understood that the performance of a supervised classification using the SSVs of constituent spectral vectors is also within the scope of the present invention.

In accordance with one aspect of the invention, the set of SSVs computed in step 118 may be analyzed in order to obtain information relevant to the quality of the associated image (step 120). In a preferred embodiment, the both the distribution and minimum of such SSVs are utilized to provide an indication of image quality. In general, it has been found that the smaller the minimum SSV associated with an image, the higher the quality of the image. Similarly, images represented by a large number of class-pairs with relatively small SSVs have been found to be of higher quality than images represented by a large number of class pairs with relatively large SSVs. Other aspects of image quality can be inferred from further analysis of the distribution of SSVs. For example, image diversity is indicated by the number of class-pairs that have relatively large SSVs and image complexity is indicated by the ratio of the number of classes found in the image divided by the area of the image.

Figure 5A:
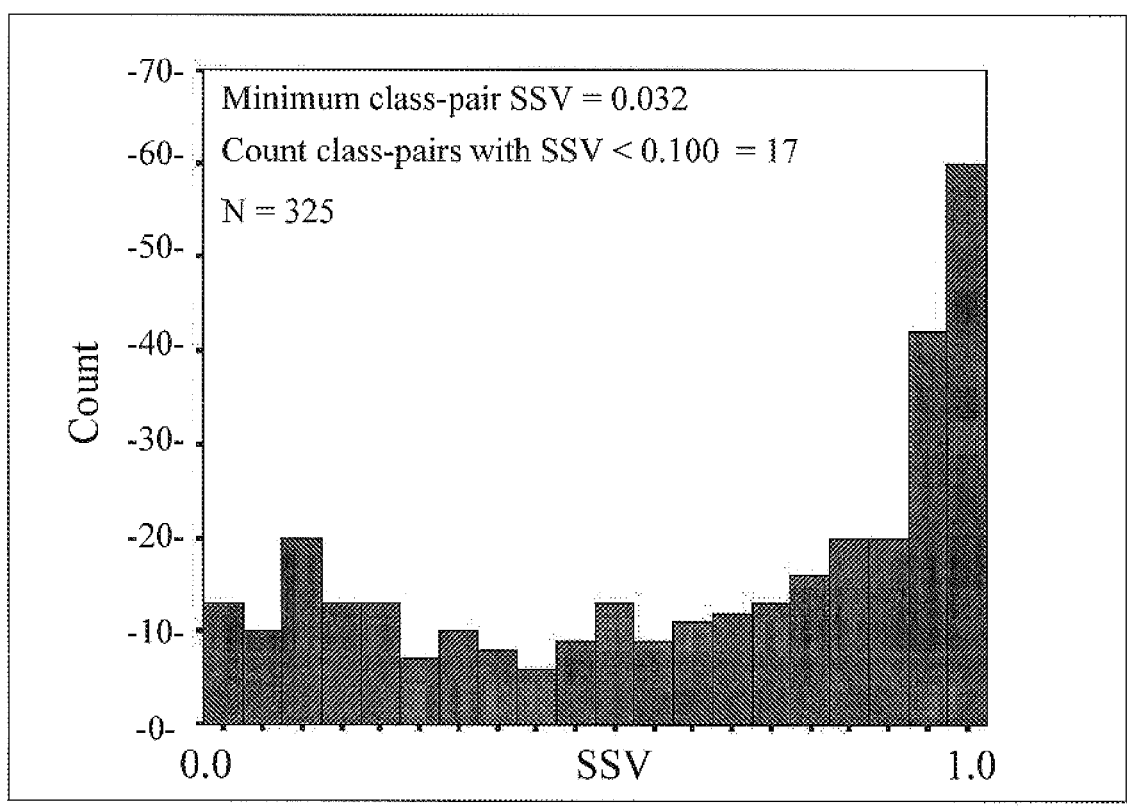
FIGS. 5A and 5B are histograms of the SSVs representative of a pair of images of the same terrain taken on different occasions.
Figure 5B:
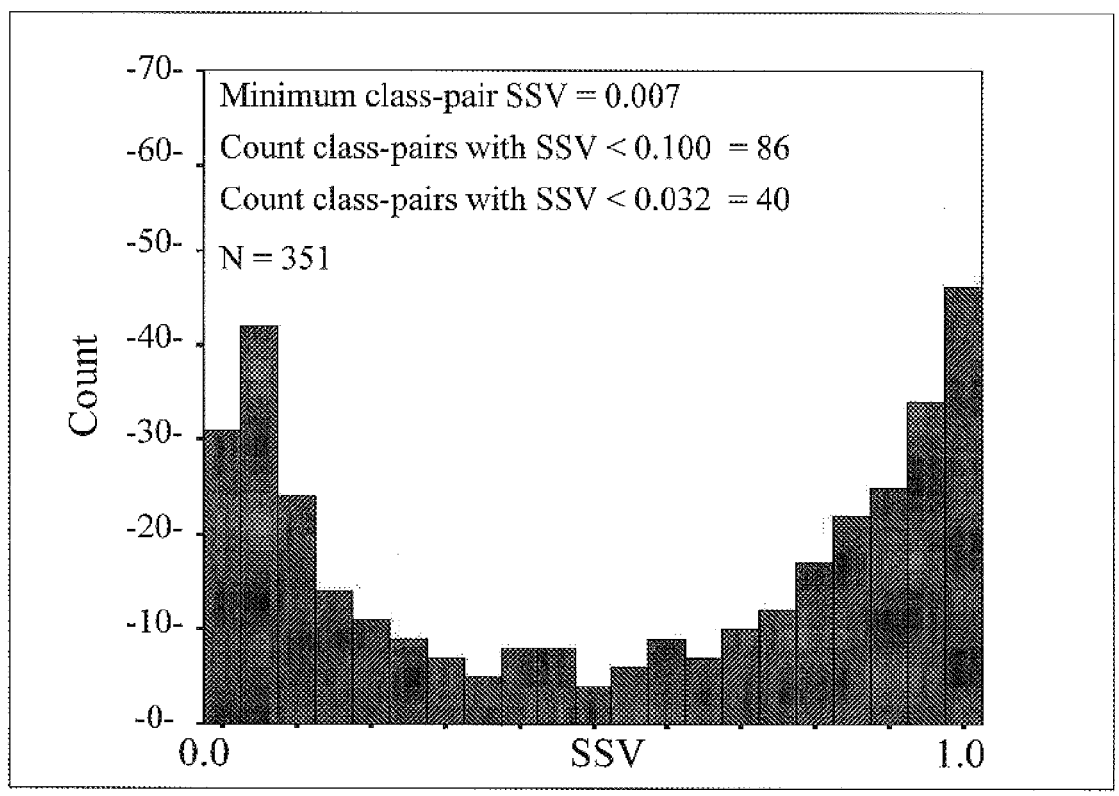

FIGS. 5A and 5B are exemplary histograms of the SSVs representative of a pair of images of the same terrain taken on different occasions. In the cases of FIGS. 5A and 5B, the unsupervised classifications conducted pursuant to step 60 above produced sets of 26 and 27 classes, respectively. This yields a set of 325 SSVs for the 325 class-pair combinations in the case of FIG. 5A, and a set of 351 SSVs in the case of FIG. 5B. The minimum SSV in the case of FIG. 5A was determined to be 0.032, and the minimum SSV in the case of FIG. 5B was found to be 0.007. As may be appreciated by reference to FIGS. 5A and 5B, there exist fewer "very similar" SSVs in FIG. 5A than in FIG. 5B. Specifically, FIG. 5A includes 17 SSVs below 0.10, while FIG. 5B includes 86 SSVs below 0.10. In addition, it is observed that 40 SSVs in FIG. 5B are smaller than minimum SSV represented in FIG. 5A (i.e., 0.032). All of the foregoing indicates that the image corresponding to the histogram of FIG. 5A is of higher quality than the image corresponding to FIG. 5B.

Image Quality Required by Spectral Task

In another aspect, the present invention contemplates determining the minimum SSV required to ensure that specific spectra indicative of differing characteristics within a subject image may be separately discerned. As an example, consider the case in which it is desired to detect when certain agricultural areas have become stressed or diseased though analysis of images of such areas. Spectra representing healthy and diseased or otherwise stressed crop could be collected using conventional means (e.g., from imagery or field data), and the SSV between the spectra representing the healthy and stressed crop would then be computed. This computed SSV would define the minimum SSV characterizing images potentially useful in discriminating between healthy and diseased crop. That is, subsequently collected images having SSVs less than this minimum SSV would be helpful in identifying such diseased areas, while subsequently collected images having SSVs exceeding this minimum SSV would not generally be helpful.

FIG. 6 provides a tabular listing of an exemplary set of minimum SSVs required to discriminate between portions of the field of corn represented by FIGS. 5A and 5B provided with differing amounts of a nitrogen fertilizer application. In the example of FIG. 6, a spectroradiometer was used on a series of dates to measure the spectra from plots of the corn field subjected to five different levels of the nitrogen application. Minimum SSVs were computed based upon the measurement results in accordance with Equations (1) through (6). These minimum SSVs comprise the entries in the listing of FIG. 6, and each represents the similarity between spectra collected from various plots. For example, on May 24, 1998 an SSV of 0.013 was found to exist between the spectra representative of a plot subjected to 120 of nitrogen per acre (120 lbs.N/acre) and the spectra representative of a plot treated with 40 lbs.N/acre. Accordingly, on that day an image would be required to be characterized by an SSV of less than approximately 0.013 in order to enable regions treated with 40 lbs.N/acre to be discriminated from those receiving 120 lbs.N/acre.

Figure 7A:
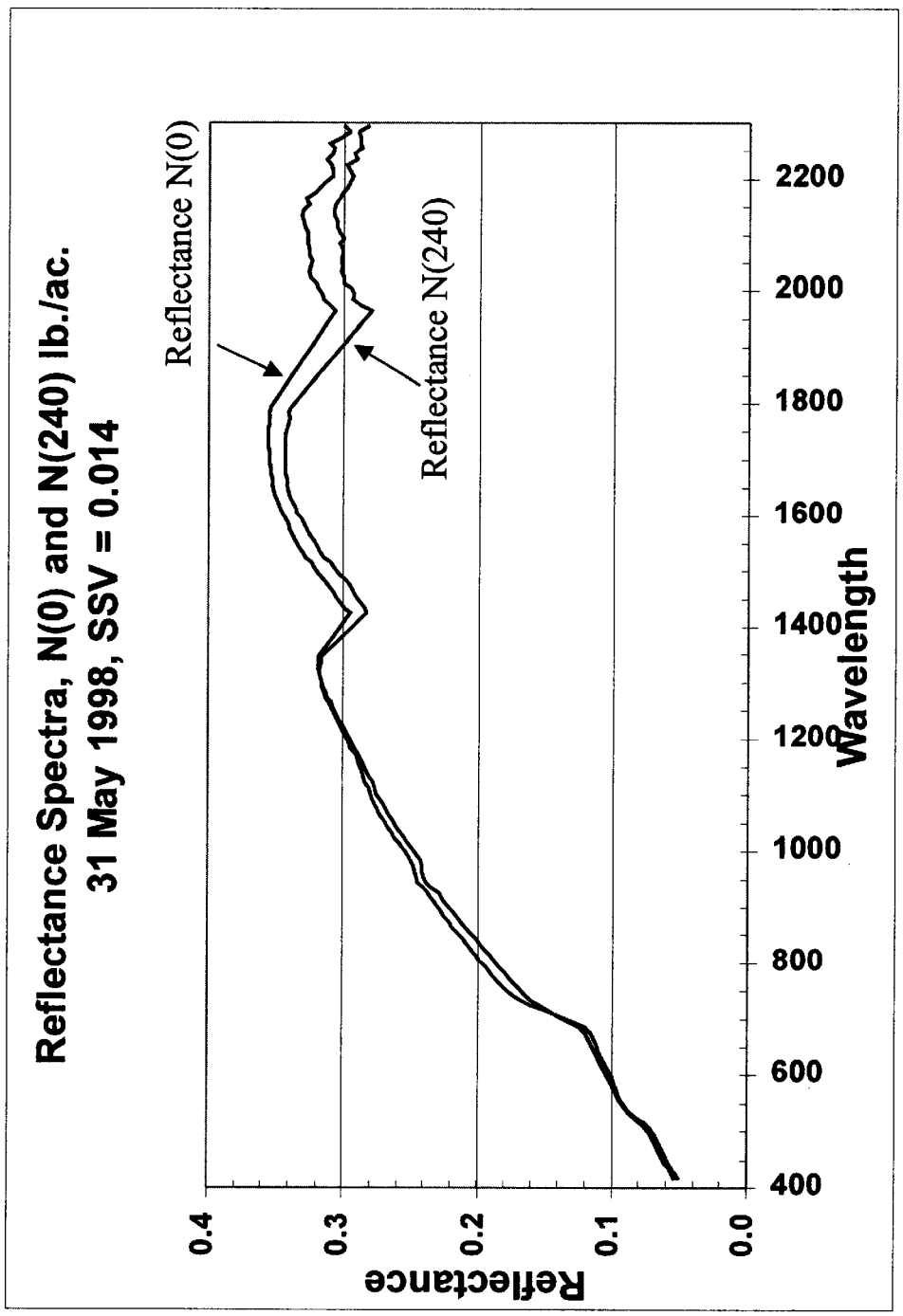
FIGS. 7A and 7B illustrate the pairs of reflectance spectra used to compute the minimum SSVs for certain of the entries in the tabular listing of FIG. 6.
Figure 7B:
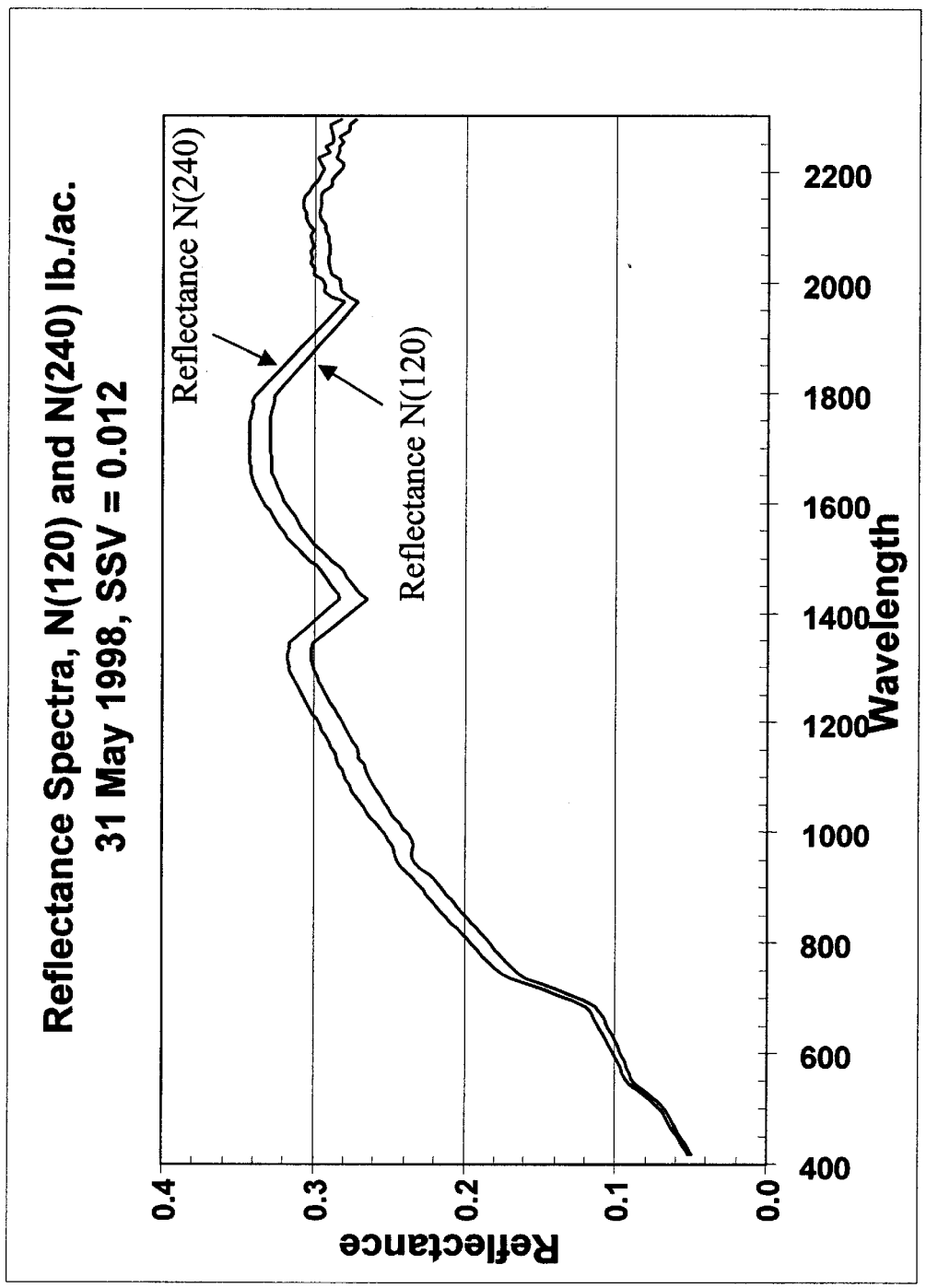
Figure 8A:
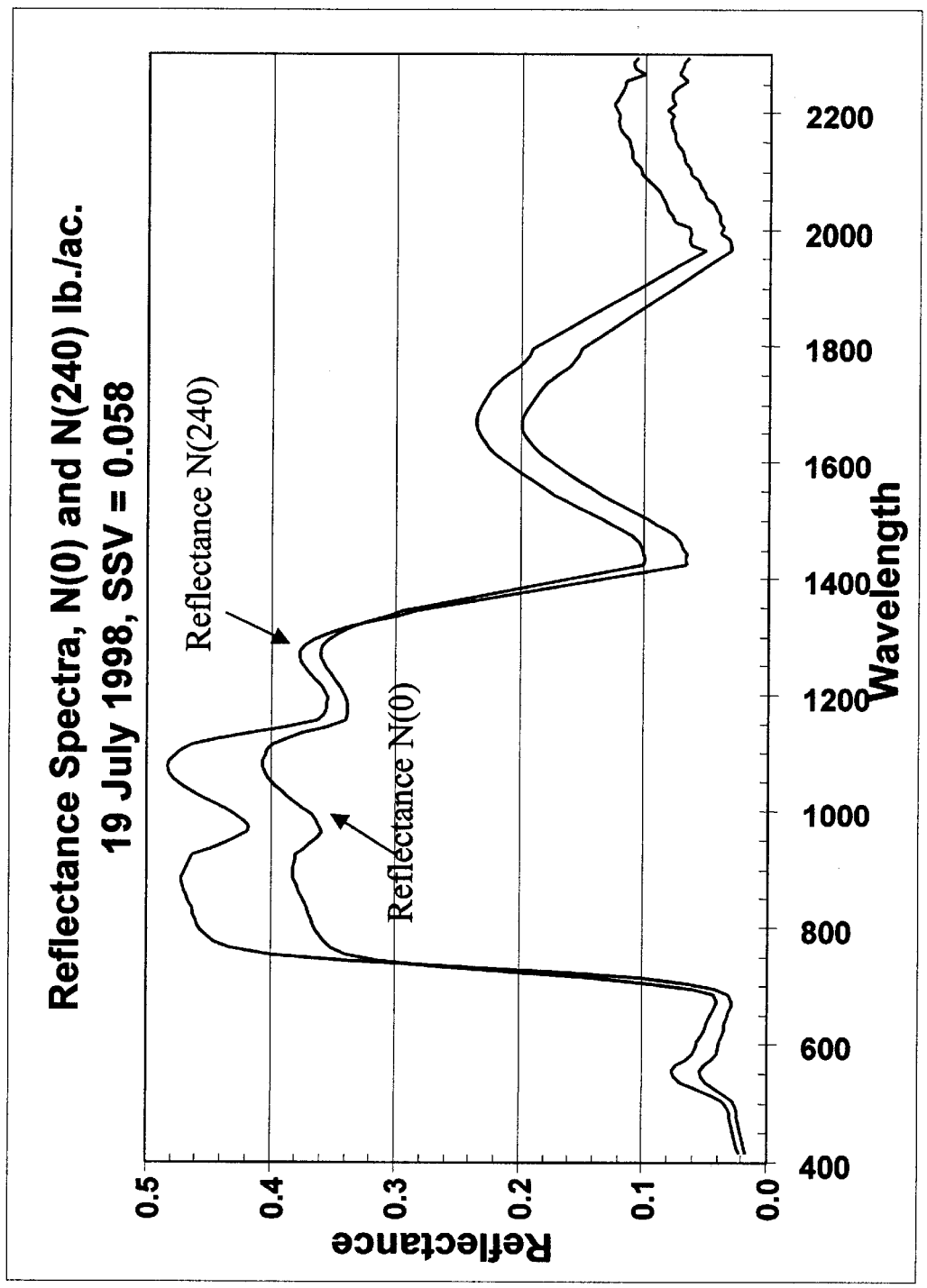
FIGS. 8A and 8B represent additional spectra collected from the plot areas represented by the tabular listing of FIG. 6.
Figure 8B:
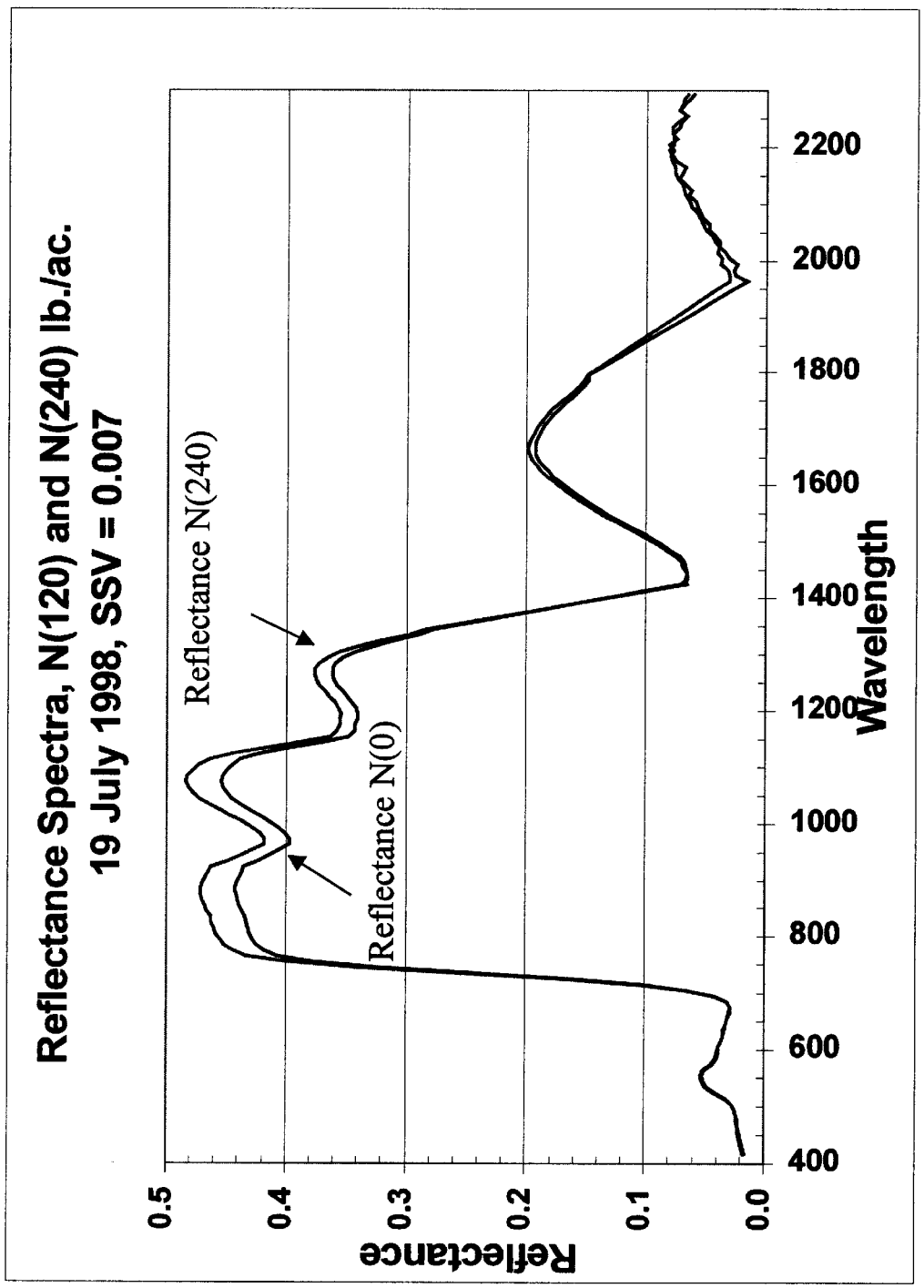

FIGS. 7A and 7B illustrate the pairs of reflectance spectra used to compute the minimum SSVs for certain of the entries in the tabular listing of FIG. 6. Specifically, FIG. 7A depicts the pair of reflectance spectra collected on May 31, 1998 used to determine the minimum SSV (i.e., 0.014) required to distinguish between plots provided with 0 lbs.N/acre from those provided with 240 lbs.N/acre. Similarly, FIG. 7B depicts the pair of reflectance spectra used to determine the minimum SSV (i.e., 0.012) necessary for distinguishing between plots receiving 120 and 240 lbs.N/acre. FIGS. 8A and 8B represent spectra collected from the same plots on Jul. 19, 1998; that is, several weeks after the spectra depicted in FIGS. 7A and 7B were collected. As is indicated by FIG. 8A, in this instance a minimum SSV of 0.058 was found to be necessary to discern between plots of the corn field respectively receiving lbs.N/acre and 240 lbs.N/acre. Similarly, a minimum SSV of 0.007 was found to be necessary to distinguish between plots receiving 120 and 240 lbs.N/acre.

Figure 9:
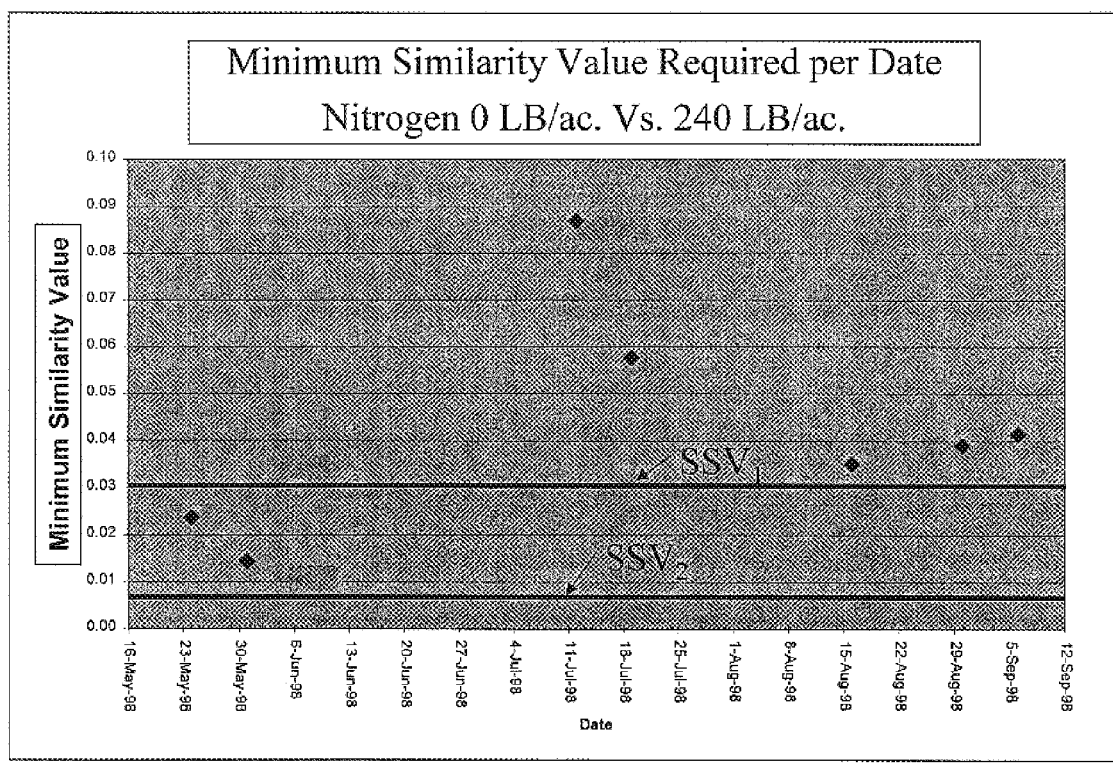
FIG. 9 graphically represents the time variation of the minimum SSVs associated with those of the plots represented by FIG. 6 which were subjected to 0 lbs/acre and 240 lbs/acre of a nitrogen fertilizer application.
Figure 10:
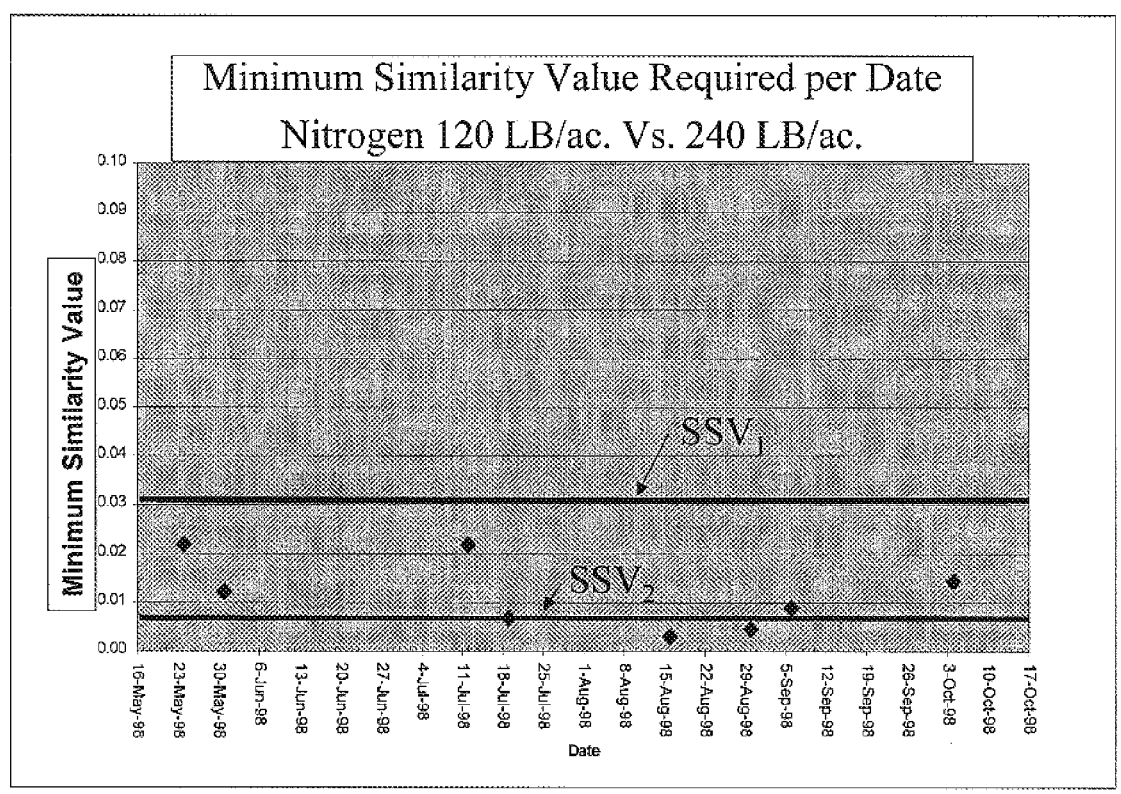
FIG. 10 graphically represents the time variation of the minimum SSVs associated with those of the plots represented by FIG. 6 which were subjected to 120 lbs/acre and 240 lbs/acre of the nitrogen fertilizer application.

FIG. 9 graphically represents the time variation of the minimum SSVs associated with those of the plots of FIG. 6 subjected to 0 lbs.N/acre and 240 lbs.N/acre. Similarly, FIG. 10 graphically represents the time variation of the minimum SSVs associated with those of the plots of FIG. 6 subjected to 120 lbs.N/acre and 240 lbs.N/acre. In order to provide context and a basis for comparison, the minimum SSV associated with the image corresponding to FIG. 5A is shown as "$SSV_1$," and the minimum SSV associated with the image corresponding to FIG. 5B is shown as "$SSV_2$". As is indicated by FIG. 9, the preponderance of minimum SSVs above both $SSV_1$ and $SSV_2$ indicates that either the image corresponding to FIG. 5A or to FIG. 5B could be utilized to discriminate plot regions subjected to 0 lbs.N/acre from plot regions subjected to 240 lbs.N/acre. In contrast and as is represented by FIG. 10, the presence of all minimum SSVs below $SSV_1$ indicates that the image corresponding to FIG. 5A would not be of use in distinguishing plots receiving 120 lbs.N/acre from those receiving 240 lbs.N/acre. Only the image corresponding to FIG. 5B would be potentially useful in so distinguishing between these plots, since $SSV_2$ is seen to be less than five of the eight computed SSVs.

Although the above application has been described primarily in the context of particular embodiments and applications, one skilled in the art can readily appreciate that the teachings of the present invention may be applied to other embodiments and applications. Thus, the application is meant only to be limited by the scope of the appended claims.

What is claimed is:

1. A method for measuring similarity between a first vector and a second vector, each element of said first vector representing a first measured characteristic associated with a respective one of a plurality of spectral bands and each element of said second vector representing a second measured characteristic associated with a respective one of said plurality of spectral bands, said method comprising:
   determining a magnitude difference between said first vector and said second vector based upon a plurality of element values defining said first vector and a corresponding plurality of element values defining said second vector;
   determining a shape difference between said first vector and said second vector based upon said plurality of element values and said corresponding plurality of element values; and
   computing a similarity between said first vector and said second vector based on said magnitude difference and said shape difference.

2. The method of claim 1 wherein said determining a magnitude difference includes computing a normalized Euclidean Distance between said first vector and said second vector.

3. The method of claim 1 wherein said first and second measured characteristics correspond to first and second reflectances, respectively, and wherein said determining a magnitude difference includes:
   computing a squared differential reflectance magnitude between said first vector and said second vector with respect to a number (N) of said spectral bands;
   summing said squared differential reflectance magnitudes; and
   dividing the sum of said squared differential reflectance magnitudes by N.

4. The method of claim 1 wherein said determining a magnitude difference includes evaluating the following expression over a number (Nb) of said spectral bands:

$$d_e = \sqrt{\frac{1}{Nb} \sum_{i=1}^{Nb} (x_i - y_i)^2}$$

wherein $d_e$ represents said magnitude difference, $x_i$ represents the value of the first vector in the $i^{th}$ of said spectral bands, and wherein $y_i$ represents the value of the second vector in the $i^{th}$ of said spectral bands.

5. The method of claim 1 wherein said determining a shape difference includes:
   computing a first differential magnitude difference between an element of said first vector and a mean value of said first vector with respect to each of a number (N) of said spectral bands;
   computing a differential magnitude difference between an element of said second vector and a mean value of said second vector with respect to each said N of said spectral bands; and
   determining a product of said first differential magnitude difference and said second differential magnitude difference with respect to each said N of said spectral bands.

6. The method of claim 5 wherein said determining a shape difference includes:
   summing said products of said first differential magnitude difference and said second differential magnitude difference;
   dividing the sum of said products by (N-1); and
   further dividing the sum of said products by the product of the standard deviation of said first vector and the standard deviation of said second vector.

7. The method of claim 1 wherein said determining a shape difference includes evaluating the following expression over a number (Nb) of said spectral bands:

$$r^2 = \left( \frac{\frac{1}{Nb-1} \sum_{i=1}^{Nb} (x_i - \mu_x)(y_i - \mu_y)}{\sigma_x \sigma_y} \right)^2$$

wherein $r^2$ is representative of said shape difference, $x_i$ represents the value of the first vector in the $i^{th}$ of said spectral bands, $y_i$ represents the value of the second vector in the $i^{th}$ of said spectral bands, $\mu_x$ represents the means value of the first vector, and $\mu_y$ represents the means value of the second vector, and wherein $\sigma_x$ represents the standard deviation of first vector and wherein $\sigma_y$ represents the standard deviation of second vector.

8. A method for measuring similarity between a first vector and a second vector, said first vector being derived from the results of a first set of spectral measurements and said second vector being derived from a second set of spectral measurements, said method comprising:
   determining a normalized distance between said first vector and said second vector based upon a plurality of element values defining said first vector and a corresponding plurality of element values defining said second vector;
   deriving a normalized shape of said first vector and a normalized shape of said second vector;
   determining a shape difference between said normalized shape of said first vector and said normalized shape of said second vector based upon said plurality of element values and said corresponding plurality of element values; and
   computing a similarity between said first vector and said second vector on the basis of said normalized distance and said shape difference.

9. The method of claim 8 wherein said determining a normalized distance includes:
   computing a differential magnitude difference between said first vector and said second vector with respect to each of a number (N) of spectral bands comprising said predetermined spectrum;
   summing said differential magnitude differences; and
   dividing the sum of said differential magnitude differences by N.

10. The method of claim 8 wherein said determining a shape difference includes:
   computing a first differential magnitude difference between an element of said first vector and a mean value of said first vector with respect to each of a number (N) of spectral bands included within said predetermined spectrum;
   computing a differential magnitude difference between an element of said second vector and a mean value of said second vector with respect to each said N of said spectral bands; and
   determining a product of said first differential magnitude difference and said second differential magnitude difference with respect to each said N of said spectral bands.

11. An image processing method, comprising:
   receiving a first spectral image;
   extracting a first input pixel from the first spectral image;
   converting the first input pixel into a first vector, each element in the first vector representing a first reflectance of a respective one of a plurality of spectral bands;
   determining a magnitude difference between said first vector and a second vector based upon a plurality of element values defining said first vector and a corresponding plurality of element values defining said second vector, said second vector being representative of a measured characteristic of a second spectral image;
   determining a shape difference between said first vector and said second vector based upon said plurality of element values and said corresponding plurality of element values; and
   computing a similarity between said first vector and said second vector on the basis of said magnitude difference and said shape difference.

12. The image processing method of claim 11 further comprising:
   receiving a second spectral image;
   extracting a second input pixel from the second spectral image; and
   converting the second input pixel into said second vector, each element in the second vector representing a second reflectance of a respective one of said plurality of spectral bands.

13. An image processing method, comprising:
   receiving a spectral image;
   organizing pixels from the spectral image into a plurality of classes;
   determining a first mean reflectance vector for a first of said plurality of classes and a second mean reflectance vector for a second of said plurality of classes; and
   computing a similarity between said first mean reflectance vector and said second mean reflectance vector based upon a magnitude difference and a shape difference therebetween.

14. The method of claim 13 wherein said computing further includes:
   computing a differential magnitude difference between said first means reflectance vector and said second mean reflectance vector with respect to each of a number (N) of spectral bands;
   summing said squared differential magnitude differences; and
   dividing the sum of said squared differential magnitude differences by N and utilizing the result to determine said magnitude difference.

15. An article of manufacture for use with a data processing system, comprising a storage medium having stored therein a spectral similarity stored program for measuring similarity between a first vector and a second vector, each element of said first vector representing a first reflectance associated with a respective one of a plurality of spectral bands and each element of said second vector representing a second reflectance associated with a respective one of said plurality of spectral bands, said data processing system being configured by said spectral similarity stored program when executed by said data processing system to:
   determine a magnitude difference between said first vector and said second vector based upon a plurality of element values defining said first vector and a corresponding plurality of element values defining said second vector;
   determine a shape difference between said first vector and said second vector based upon said plurality of element values and said corresponding plurality of element values; and
   compute a similarity between said first vector and said second vector on the basis of said magnitude difference and said shape difference.

16. An image processing system comprising:
   an input interface through which is received a spectral image;
   a storage medium having stored therein a spectral similarity stored program; and
   a processor operative to execute said spectral similarity stored program and thereby:
      (i) organize pixels from the spectral image into a plurality of classes,
      (ii) determine a first mean reflectance vector for a first of said plurality of classes and a second mean reflectance vector for a second of said plurality of classes, and
      (iii) compute a similarity between said first mean reflectance vector and said second mean reflectance vector based upon a magnitude difference and a shape difference therebetween.

17. The system of claim 16 wherein said processor is further operative to:
   compute a differential magnitude difference between said first means reflectance vector and said second mean reflectance vector with respect to each of a number (N) of spectral bands;
   sum said differential magnitude differences; and
   divide the sum of said differential magnitude differences by N and utilizing the result to determine said magnitude difference.

18. An image processing system comprising:
   an input interface through which is received a first spectral image;
   a storage medium having stored therein a spectral similarity stored program; and
   a processor operative to execute said spectral similarity stored program and thereby:
      (i) extract a first input pixel from the first spectral image,
      (ii) converting the first input pixel into a first vector, each element in the first vector representing a first reflectance of a respective one of a plurality of spectral bands,
      (iii) determine a magnitude difference between said first vector and a second vector based upon a plurality of element values defining said first vector and a corresponding plurality of element values defining said second vector, (iv) determining a shape difference between said first vector and said second vector based upon said plurality of element values and said corresponding plurality of element values, and (v) compute a similarity between said first vector and said second vector based on said magnitude difference and said shape difference.

19. The image processing system of claim 18 wherein said processor is further operative to:

extract a second input pixel from a second spectral image received through said input interface; and convert the second input pixel into said second vector, each element in the second vector representing a second reflectance of a respective one of said plurality of spectral bands.

20. A method for measuring similarity between a first mean spectral vector and a second mean spectral vector, said method comprising:

deriving said first mean spectral vector from a first set of spectral vectors, and deriving said second mean spectral vector from a second set of spectral vectors;

determining a magnitude difference between said first mean spectral vector and said second mean spectral vector;

determining a shape difference between said first mean spectral vector and said second mean spectral vector; and computing a similarity between said first mean spectral vector and said second mean spectral vector on the basis of said magnitude difference and said shape difference.

21. The method of claim 20 wherein said determining a magnitude difference includes computing a normalized Euclidean Distance between said first mean spectral vector and said second mean spectral vector.

22. The method of claim 20 wherein said first mean spectral vector corresponds to a first mean measured reflectance and wherein said mean spectral vector corresponds to a second mean measured reflectance, respectively, and wherein said determining a magnitude difference includes:

computing a squared differential reflectance magnitude between said first mean spectral vector and said second mean spectral vector with respect to a number (N) of said spectral bands;

summing said squared differential reflectance magnitudes; and dividing the sum of said squared differential reflectance magnitudes by N.

23. The method of claim 20 wherein said determining a shape difference includes determining a first mean value of said first mean spectral vector and a second mean value of said second mean spectral vector.

24. The method of claim 23 wherein said determining a shape difference further includes computing a first difference between an element of said first mean spectral vector and said first mean value and computing a second difference between an element of said second mean spectral vector and said second mean value.

25. The method of claim 24 wherein said determining a shape difference further includes determining a product of said first difference and said second difference.

26. The method of claim 25 wherein said determining a shape difference further includes determining a product of a standard deviation of said first mean spectral vector and a standard deviation of said second mean spectral vector.

* * * * *